United States Patent [19]
Ando et al.

[11] Patent Number: 5,330,264
[45] Date of Patent: Jul. 19, 1994

[54] METHOD AND APPARATUS FOR COPYING AND MANUFACTURING HOLOGRAM PLATE

[75] Inventors: Hirosi Ando, Aichi; Masayuki Goto, Kariya, both of Japan

[73] Assignee: Nippondenso Co., Ltd., Kariya, Japan

[21] Appl. No.: 877,517

[22] Filed: May 1, 1992

[30] Foreign Application Priority Data

May 1, 1991 [JP] Japan .................. 3-100099

[51] Int. Cl.$^5$ .................. G03H 1/20
[52] U.S. Cl. .................. 359/12; 359/8; 359/30; 430/1
[58] Field of Search ............. 359/8, 12, 30; 430/1, 430/2

[56] References Cited

U.S. PATENT DOCUMENTS

| | | |
|---|---|---|
| 4,458,977 | 7/1984 | Arns et al. . |
| 4,984,856 | 1/1991 | Moss et al. .................. 359/12 |
| 5,103,323 | 4/1992 | Magarinos et al. .................. 359/8 |

FOREIGN PATENT DOCUMENTS

| | | |
|---|---|---|
| 57-200076 | 12/1982 | Japan . |
| 59-3463 | 1/1984 | Japan .................. 359/12 |
| 60-122983 | 7/1985 | Japan . |
| 1-204089 | 8/1989 | Japan .................. 359/12 |
| 3273276 | 12/1991 | Japan . |

*Primary Examiner*—Martin Lerner
*Attorney, Agent, or Firm*—Cushman, Darby & Cushman

[57] ABSTRACT

A hologram plate manufacturing apparatus comprising a copying optical element disposed in opposed relation to a photosensitive surface of a hologram plate. The copying optical element is arranged so that its one surface facing the photosensitive surface of the hologram plate has a plane configuration and its other surface has a convex or concave configuration. On the convex or concave surface there is formed a reflection film for effectively reflecting incident light. Also included a refraction index adjusting layer which is provided between the photosensitive surface of the hologram plate and the convex or concave surface of the copying optical element, the refraction index adjusting layer having an index of refraction substantially equal to indexes of refraction of the hologram plate and the copying optical element. Further, a prism is disposed in opposed relation to the incident surface of the hologram plate and arranged such that light incident on the incident surface of the hologram plate and reflected on the reflection film is not re-reflected on the incident surface of the hologram plate so as not to be directed toward the hologram plate. This arrangement can suppress generation of noise images due to unnecessary reflection.

13 Claims, 4 Drawing Sheets

METHOD AND APPARATUS FOR COPYING AND MANUFACTURING HOLOGRAM PLATE

BACKGROUND OF THE INVENTION

The present invention relates to a method and apparatus for copying and manufacturing a hologram plate by a single-beam exposure system.

Conventionally, there are known techniques to effectively mass-produce a number of holograms. The techniques include a method of copying a master hologram and a method of copying an optical element (concave mirror). According to such copying methods, air exists between an optical element (or a master hologram) and a photosensitive substrate (base) for taking a photograph of a hologram. The air is greatly different in index of refraction from a glass of the photosensitive substrate, that is, the index of refraction of the air is 1 and the index of refraction of the glass is 1.52. Thus, such copying methods can cause many unnecessary interface reflections to occur to produce interference fringes. These interference fringes are recorded as noises in the photographing of the hologram, thereby deteriorating the performance of the optical element. For example, in the case of copying a concave mirror, the focal point can be formed at an unnecessary position due to noises having different focal lengths.

One possible solution is that as disclosed in the Japanese Patent provisional Publication No. 60-122983 wherein a refraction index adjusting liquid such as a silicon oil having an index of refraction extremely close to that of the glass is disposed between the photosensitive substrate and the optical element so as to eliminate the interface reflections to prevent the recording of the unnecessary interference fringes. However, there is a problem which arises with such a method in that a large quantity of refraction index adjusting liquid exists between the photosensitive substrate and the optical element because the surface of the optical element facing the photosensitive substrate is arranged to be concaved. In other words, the large quantity of refraction index adjusting liquid exists between two light beams to be interfered. Thus, difficulty is encountered to stably form the interference fringes when the refraction index adjusting liquid moves due to slight vibration, temperature variation, etc. and hence we have to have a long wait until the movement of the refraction index adjusting liquid falls. This causes the cycle time of the exposure process to become extremely long and makes difficult the mass production of the holograms.

SUMMARY OF THE INVENTION

It is therefore an object of the present invention to provide a hologram copying method which is capable of shortening the cycle time of the exposure process to improve the mass production performance.

Another object of this invention is to provide a reflection type hologram plate manufacturing apparatus which is capable of reducing the reflection light on a photosensitive substrate to reduce display noises on a hologram optical element.

A hologram plate manufacturing apparatus according to this invention comprises a hologram plate having a photosensitive surface and a light incident surface; a copying optical element disposed so that one surface of the copying optical element is in opposed relation to the photosensitive surface of the hologram plate and arranged so that a reflection film is provided on the other surface thereof; and re-reflection preventing means for preventing light incident on the light incident surface of the hologram plate and reflected on the reflection film of the copying optical element from being re-reflected on the light incident surface of the hologram plate. The re-reflection preventing means comprises an optical member arranged such that the re-reflection light does not advance toward the hologram plate and the optical member is a prism having an angle whereby the re-reflection light does not advance toward the hologram plate. Preferably, refraction index adjusting layers are further provided between the copying optical element and the hologram plate and between the hologram plate and the prism, each of the refraction index adjusting layers having an index of refraction substantially equal to indexes of refraction of the copying optical element, the hologram plate and the prism.

Further, according to this invention there is provided a method of copying and manufacturing a hologram plate by a single-beam exposure system in which a copying optical element having on one surface a reflection film disposed in opposed relation to a hologram plate. The hologram plate has a photosensitive surface and a light-incident surface so that reference light incident on the light-incident surface of the hologram plate is reflected on the reflection film of the copying optical element to form object light which is in turn interfered with the reference light on the photosensitive surface of the hologram plate. The method of copying and manufacturing a hologram plate comprising a step of preventing the reference light, incident on the light-incident surface of the hologram and reflected on the reflection film of the copying optical element, from being re-reflected on the light-incident surface of the hologram plate. The incidence of the reference light to the reflection film of the copying optical element is effected through an optical member arranged so that light reflected on the reflection film and re-reflected on the light-incident surface of the hologram plate does not advance toward the hologram plate whereby the optical member prevents the re-reflection of the reflected light on the light-incident surface of the hologram plate. Preferably, refraction index adjusting layers are provided between the copying optical element and the hologram plate and between the hologram plate and the optical member. Each of the refraction index adjusting layers having an index of refraction substantially equal to the indexes of refraction of the copying optical element, the hologram plate and the optical member.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
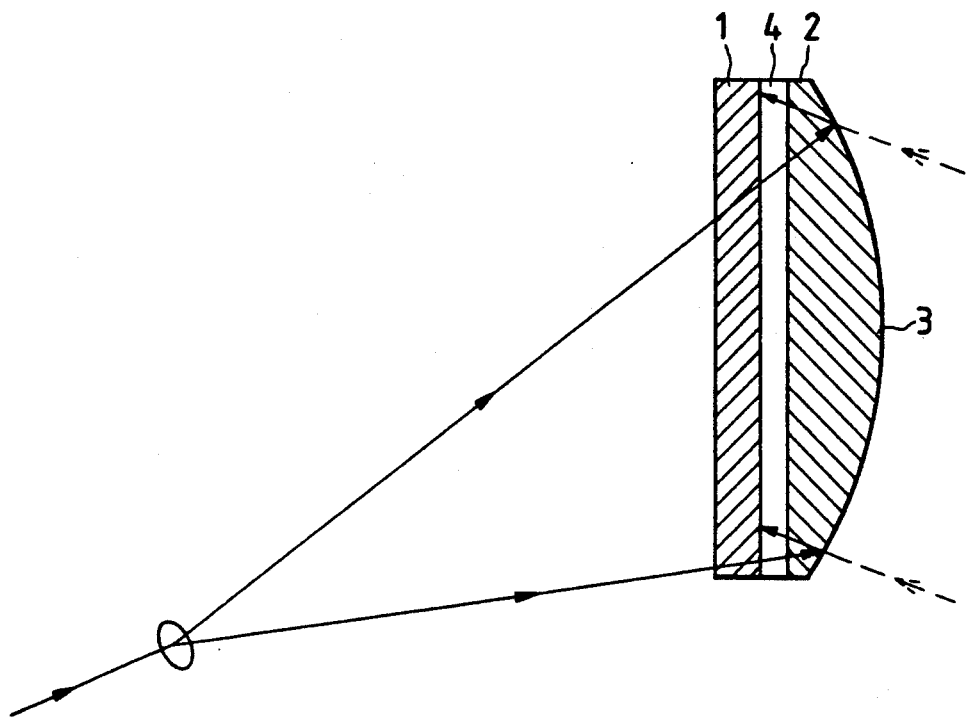
FIG. 1 is a cross-sectional view for describing a copying method of a hologram according to a first embodiment of the present invention.

A hologram copying method according to a first embodiment of this invention will be described hereinbelow with reference to FIG. 1. The first embodiment relates to a manufacturing method in the case that a hologram concave mirror is recorded on a gelatine dichromate photosensitive member. In FIG. 1, designated at numeral 1 is a hologram plate (photosensitive substrate) which is made by applying a gelatine (including ammonium dichromate of 0.8 weight % and photoflood gelatine of 4 weight % relative to water of 100) to one surface of a plane glass base having a thickness of 3 mm before sufficiently drying it within a constant-temperature (thermostatic) constant-humidity chamber in which the temperature is 20° C. and the humidity is 50%. Further, numeral 2 denotes an optical element disposed in opposed relation to the hologram plate 1. Optical element 2 is a plane-convex lens whose one surface has a plane (flat) configuration and the other surface has a convex configuration. The convex surface of the plane-convex lens 2 is treated with a well-known aluminium deposition so as to form a high-reflection film 3. The gelatine surface of the hologram plate 1 and the plane surface of the plane-convex lens face each other and a space formed therebetween is filled with a silicon oil (KF-56) 4 which is in turn sealed in that place. For exposure, an argon laser light having a wavelength of 514.5 nm is projected on the hologram plate 1 side.

Secondly, a development process is effected as follows: 1) washing the hologram plate 1 for 15 minutes in water whose temperature is 20° C.; 2) bathing it for 2 minutes in hot water whose temperature is 30° C.; 3) immersing it for 3 minutes in an aqueous solution of 70% isopropyl alcohol whose temperature is 30° C.; 4) immersing it for 1 minute in aqueous solution of 90% isopropyl alcohol whose temperature is a room temperature; 5) immersing it for 3 minutes in aqueous solution of 100% isopropyl alcohol whose temperature is a room temperature; 6) thereafter drying it for 30 minutes by an oven whose temperature is 90° C., thereby manufacturing a hologram concave mirror having a reflection efficiency of above 80%.

According to this embodiment, since the silicon oil 4 to be used as the refraction index adjusting liquid 4 exists between the gelatine surface of the hologram plate 1 and the plane surface of the plane-convex lens 2, it is possible to considerably reduce the used amount of the silicon oil 4 up to about 1/1000 as compared with the conventional one. As a result, the exposure waiting time for making stable the movement of the silicon oil 4 can be reduced in the hologram photographing so as to shorten the cycle time of the exposure process. This greatly improves the mass production performance. In addition, the reduction of the used amount of the silicon oil 4 can reduce the production cost.

Here, although in the above description the high-reflection film 3 is made by the aluminium deposition on the convex surface of the plane-convex lens 2, it is appropriate to deposite a metal such as silver, chromium and gold or a metallic oxide thereon.

Figure 2:
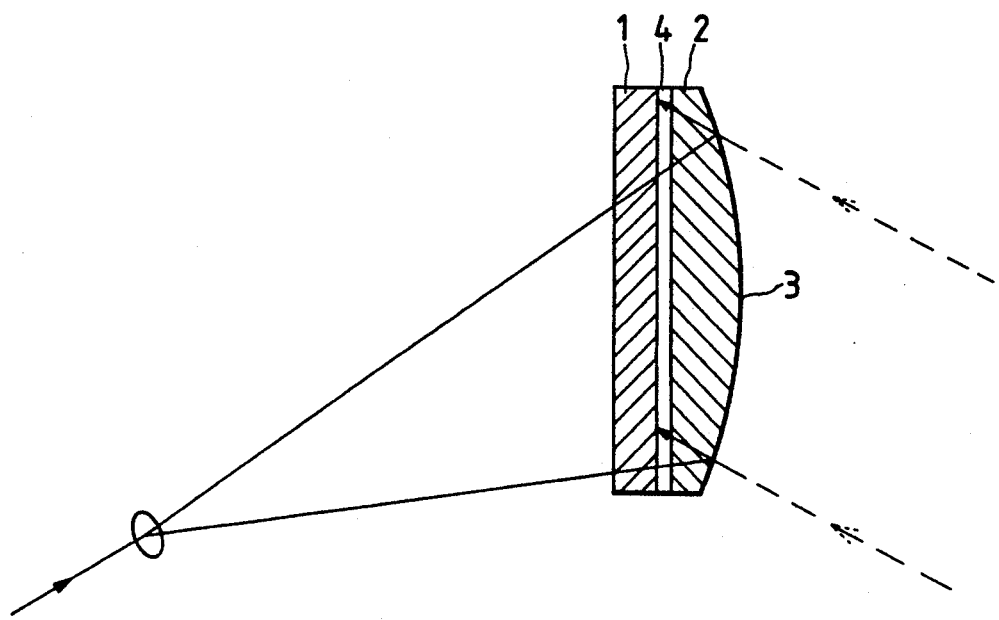
FIG. 2 is a cross-sectional view for describing a copying method of a hologram according to a second embodiment of this invention.

FIG. 2 is for describing a second embodiment of this invention. In FIG. 2, one feature of this second embodiment is that the convex surface of the plane-convex lens 2 is arranged to have a paraboloid configuration. With this arrangement, when light emitted from one point is incident thereon for the exposure, the reflection light becomes parallel light. As a result, when copying it is possible to eliminate an aberration (astigmatism).

Figure 3:
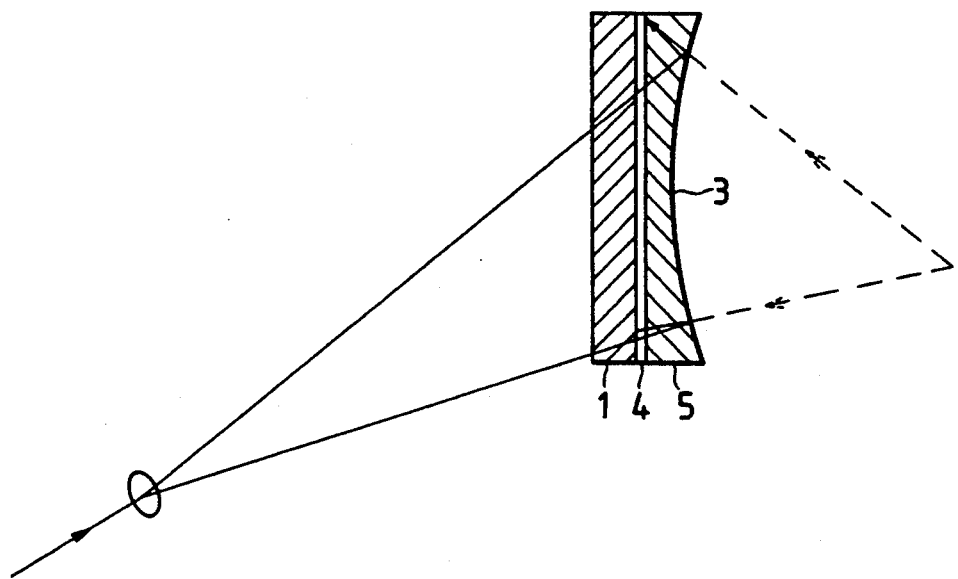
FIG. 3 is a cross-sectional view for describing a copying method of a hologram according to a third embodiment of this invention.

FIG. 3 is for describing a third embodiment of this invention. In FIG. 3, one feature of this third embodiment is that a plane-concave lens 5, whose one surface is flat and other surface is concave, is used as the optical element. A high-reflection film 3 is formed on the concave surface thereof. This plane-concave lens 5 can be used when recording interference fringes due to divergent light.

Figure 4:
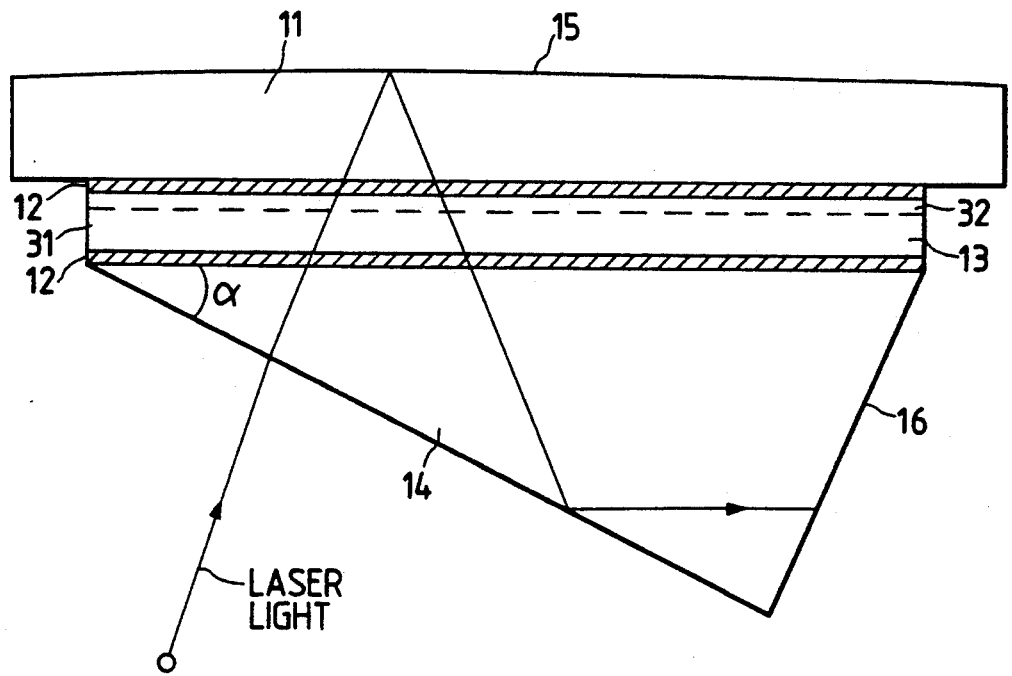
FIG. 4 is a cross-sectional view showing an optical element copying reflection type hologram plate manufacturing apparatus according to a fourth embodiment of this invention.

Further, a description will be made hereinbelow with reference to FIG. 4 in terms of a reflection type hologram plate manufacturing apparatus for copy of an optical element according to a fourth embodiment of the present invention. In FIG. 4, the hologram plate manufacturing apparatus includes a copying lens 11 whose one surface has a plane configuration and other surface has a convex configuration or concave configuration, refraction index adjusting layers 12, and a hologram plate 13 interposed between the refraction index adjusting layers 12 and attached through one refraction index adjusting layer 12 to the plane surface of the copying lens 11. Also included in the apparatus are a prism 14 whose one surface is attached through the other refraction index adjusting layer 12 to the hologram plate 13, a high-reflection film 15 formed and attached onto the concave surface of the copying lens 11 by means of the aluminium deposition technique, and a light absorbing film 16 coated with a black color material on a laser-light non-incident surface of the prism 14.

The high-reflection film 15 attached to the concave surface of the copying lens 11 can effectively reflects the incident light (laser light), and hence, in the optical element copying method, the configuration of the film-attached surface of the copying lens 11 is copied on the hologram plate 13 so that the surface configuration thereof becomes the copied original. Here, although the copy lens 11 has the concave configuration, it is appropriate that the copy lens 11 is arranged to have a convex configuration.

The refraction index adjusting layers 12 are for preventing the interface reflections of light and are arranged to have an index of refraction extremely close to the index of refraction of the materials of the copying lens 11, hologram plate 13 and prism 14. For example, in the case that copying lens 11, hologram plate 13 and prism 14 are made of a glass material (index of refraction: 1.52), the refraction index adjusting layers 12 can be made of a silicon oil (index of refraction: 1.5), xylene (index of refraction: 1.49) or other materials which have an index of refraction close to that of the glass material.

Figure 5:
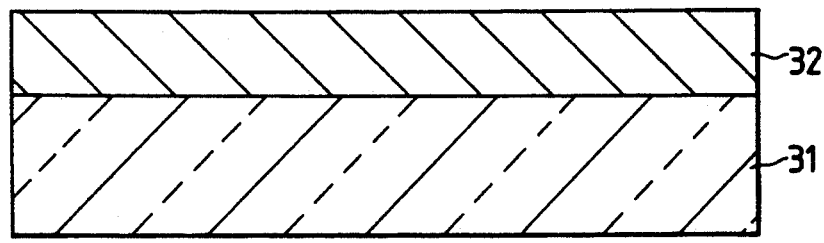
FIG. 5 is a cross-sectional view showing an arrangement of a hologram plate according to this invention.

FIG. 5 is a cross-sectional view showing an arrangement of a hologram plate 13 according to this invention. In FIG. 5, the hologram plate 13 comprises an optically transparent glass plate 31 and a photosensitive layer 32. For formation of the photosensitive layer 32, ammonium dichromate of 0.6 g is melted in 4% gelatine aqueous solution of 100 ml so as to obtain gelatine dichromate photosensitive liquid having an index of refraction of about 1.55, which is in turn dripped and coated on one surface of the glass plate 31 to take a coating of 0.16 ml/cm$^2$. The coating and then dried for 24 hours in the ambient atmosphere of 20° C. and 50% RH. Here, the non-reflection process is not effected which has conventionally been performed for the hologram plate surface.

For example, a silicon oil is coated on the other surface of the glass plate 31 and/or the surface of the prism 14 to form the refraction index adjusting layer 12 therebetween whereby the glass plate 31 and the prism 14 are integrally attached through the refraction index adjusting layer 12 to each other so as to remove air therebetween (i.e., prevent a formation of an air layer therebetween, to thereby prevent the reflection of light). Similarly, the refraction index adjusting layer 12 is formed by a silicon oil between the photosensitive layer 32 and the copy lens 11 to thereby prevent the reflection of light.

Secondly, a description will be made hereinbelow in terms of elimination of display noises other than a proper display image in this embodiment. Returning back to FIG. 4, when the argon laser light having a wavelength of 514.5 nm is incident on the incident surface of the prism 14, since the index of refraction thereof is uniform, the incident laser light linearly advances so as to form interference fringes in the hologram plate 13 in cooperation with the light reflected from the high-reflection film 15 of the copying lens 11. A portion of the reflected light is not reflected by the glass plate 31 of the hologram plate 13, but is passed through the glass plate 31 thereof by the refraction index adjusting layer 12 so as to be incident on the prism 14 to be partially reflected on the incident surface of the prism 14. In this case, the angle $a$ of the incident surface of the prism 14 is adjusted with respect to the incident laser light so that the reflected light on the incident surface of the prism 14 is not directed toward the hologram plate 13. Thus, the prism 14 allows the elimination of the display noises due to the interface reflection light. Here, if there is the possibility that the reflected light on the incident surface of the prism 14 is reflected on the non-incident surface of the prism 14 so as to be incident on the hologram plate 13, the light absorbing film 16 provided on the non-incident surface of the prism 14 absorbs the light incident on the non-incident surface, thereby more surely eliminating the display noises.

Figure 6:
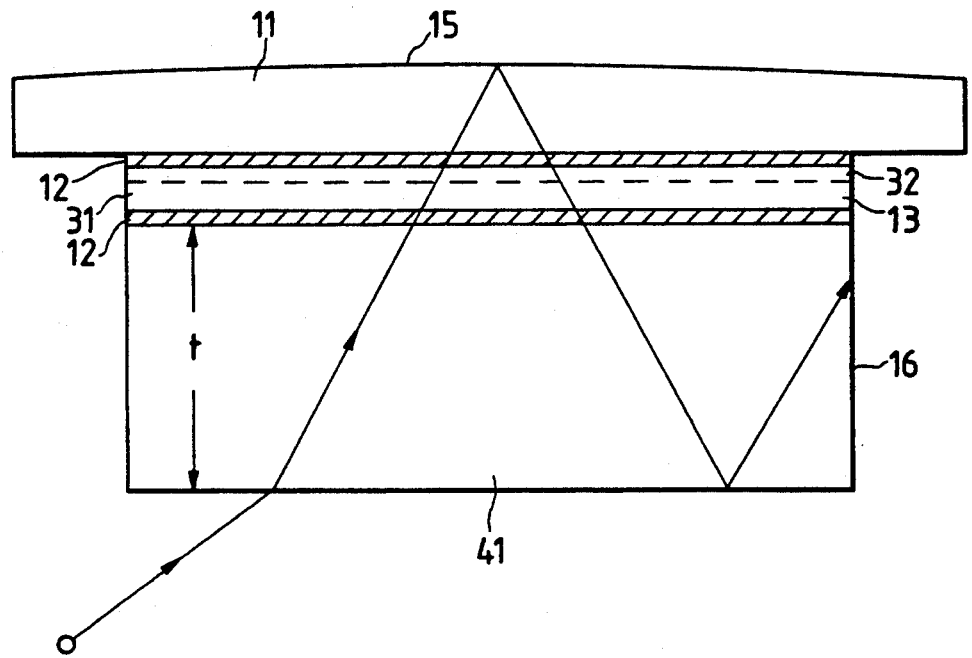
FIG. 6 is a cross-sectional view showing a reflection type hologram plate manufacturing apparatus according to a fifth embodiment of this invention.

A fifth embodiment of this invention will be described hereinbelow with reference to FIG. 6 where parts corresponding to those in FIG. 4 are marked with the same numerals. One difference of this fifth embodiment from the above-described fourth embodiment is that a thick glass plate 41 is provided in place of the prism 14. Similarly, a light absorbing film 16 is provided on one side surface of the thick glass plate 41. In this embodiment, the thickness t of the thick glass plate 41 is adjusted so that the reflected light on the incident surface of the thick glass plate 41 is not directed toward the hologram plate 3. The thick glass film 41 similarly has an index of reflection substantially equal to the other constituting devices.

Figure 7:
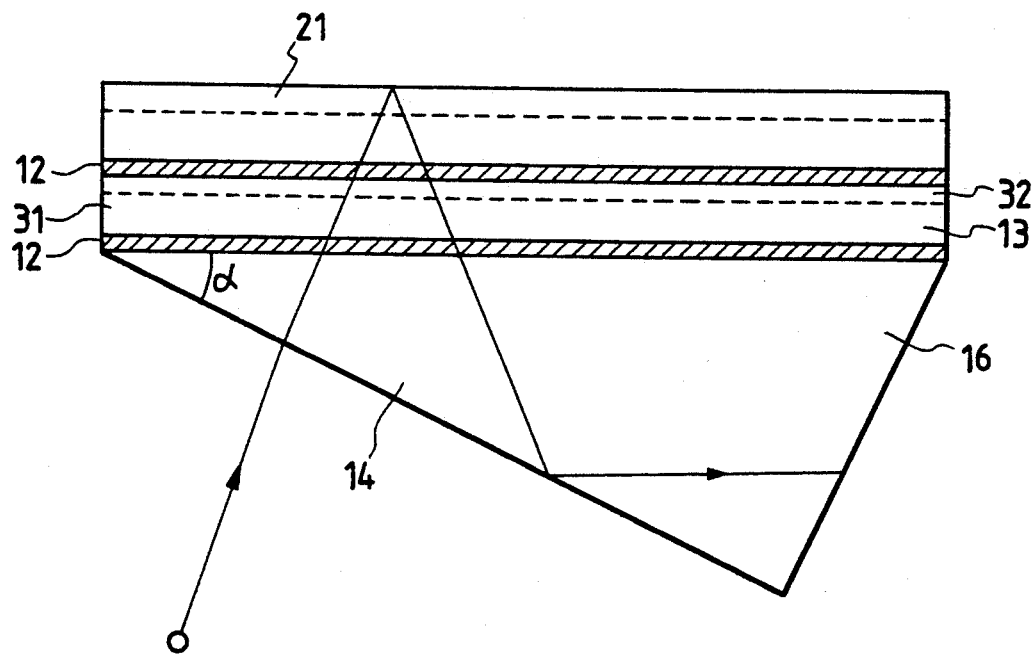
FIG. 7 is a cross-sectional view showing a reflection type hologram plate manufacturing apparatus according to a sixth embodiment of this invention.

Furthermore, a sixth embodiment of this invention will be described hereinbelow with reference to FIG. 7 where parts corresponding to those in FIG. 4 are marked with the same numerals. As seen from FIG. 7, one difference of this embodiment from the above-described fourth embodiment is that a reflection type master hologram 21 in which an image is recorded in accordance with the 10 above-described embodiments is used instead of the copying lens 11. For obtaining this reflection type master hologram 21, the development process described in the first embodiment is effected after the exposure by the laser light projection in the fourth and fifth embodiments. As a result, it is possible to produce a hologram concave mirror having a reflection efficiency of above 80%. This reflection type master hologram 21 has a concave mirror reflection property similar to that of the copying lens 11 in the fourth and fifth embodiments, and hence can act as the copying optical element. Further, even if this reflection type master hologram 21 is used in place of the copying lens 11 in the fifth embodiment, it is possible to offer the same effect.

According to the above-described embodiments, after being passed through the reflection type hologram plate, the light reflected on the copying optical element is introduced through the refraction index adjusting layer into the prism and then re-reflected on the incident surface of the prism so as to prevent the light from being directed toward the reflection type hologram plate, thereby reducing the display noises due to the reflection.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A hologram plate manufacturing apparatus comprising:
    a hologram plate having a photosensitive surface and a light incident surface;
    a copying optical element having a first surface in opposed relation to said photosensitive surface of said hologram plate and a second surface provided with a reflection film;
    an optical member disposed adjacent to said light incident surface of said hologram plate, said optical member being adjusted such that when light incident through said hologram plate and reflected on said copying optical element is re-reflected on said optical member, the re-reflected light does not advance toward said hologram plate; and
    a refraction index adjusting layer disposed between said hologram plate and said optical member, said adjusting layer having a refraction index substantially equal to refraction indexes of said hologram plate and said optical member so that light is not substantially refracted or reflected as it passes through said refraction index adjusting layer.

2. An apparatus as claimed in claim 1, wherein said optical member comprises a prism having an angle selected such that the re-reflected light does not advance toward said hologram plate.

3. An apparatus as claimed in claim 2, further comprising a second refraction index adjusting layer provided between said hologram plate and said copying optical element.

4. An apparatus as claimed in claim 2, wherein a light absorbing film is formed on a non-incident surface of said prism.

5. An apparatus as claimed in claim 1, wherein said optical member comprises a thick glass, the thickness of which is arranged so that the re-reflected light does not advance toward said hologram plate.

6. An apparatus as claimed in claim 5, further comprising a second refraction index adjusting layer provided between said copying optical element and said hologram plate.

7. An apparatus as claimed in claim 6, further comprising a light absorbing film formed on a non-incident surface of said thick glass.

8. An apparatus as claimed in claim 1, wherein said copying optical element is a master hologram recorded in advance.

9. An apparatus as claimed in claim 1, wherein the second surface of said copying optical element on which said reflection film is formed has a convex configuration.

10. An apparatus as claimed in claim 1, wherein a refraction index adjusting layer is provided between said copying optical element and said hologram plate, said refraction index adjusting layer having an index of refraction substantially equal to indexes of refraction of said copying optical element and said hologram plate.

11. An apparatus as claimed in claim 1, wherein the second surface of said copying optical element on which said reflection film is formed has a concave configuration.

12. A single beam exposure method of manufacturing a hologram plate using a copying optical element having a first surface and a second surface having a reflection film thereon; said first surface being in opposed relation to a hologram plate having a photosensitive surface and a light-incident surface; and a refraction index adjusting layer disposed between said hologram plate and an optical member, comprising the steps of:
    a. directing reference light toward said light-incident surface of said hologram plate, said reference light passes through said hologram plate and is reflected on said reflection film of said copying optical element, said reflected light interferes with said reference light on said photosensitive surface of said hologram plate so that said hologram plate is exposed;
    b. preventing said reflected light from being re-reflected on said light incident surface of said hologram plate;
    c. re-reflecting said reflected light, after said reflected light passes through said hologram plate, on an incident surface of said optical member such that said re-reflected light does not advance toward said incident surface of said hologram plate; and
    d. developing said exposed hologram plate.

13. A method of claim 12, further comprising, after the step of re-reflecting, the step of absorbing said re-reflected light on a non-incident surface of said optical member.

* * * * *